United States Patent [19]

Christianson

[11] E Patent Number: Re. 31,932

[45] Reissued Date of Patent: Jul. 2, 1985

[54] DIAPHRAGM ASSEMBLY FOR THE DEMAND REGULATOR OF A BREATHING APPARATUS

[76] Inventor: Raymond A. Christianson, P.O. Box 3700, Manhattan Beach, Calif. 90266

[21] Appl. No.: 433,277

[22] Filed: Oct. 7, 1982

Related U.S. Patent Documents

Reissue of:

[64] Patent No.: 4,147,176
Issued: Apr. 3, 1979
Appl. No.: 591,710
Filed: Jun. 30, 1975

U.S. Applications:

[63] Continuation of Ser. No. 249,345, Mar. 31, 1981, abandoned.

[51] Int. Cl.[3] ..... A62B 7/04

[52] U.S. Cl. ..... 128/204.26; 92/6 D; 137/102; 137/505.46; 137/DIG. 9

[58] Field of Search ..... 128/204.24, 204.26, 128/276; 137/102, 107, 116.3, 116.5, 494, 505.11, 505.46, 505.47; 92/6 D, 98 R, 98 D, 102

[56] References Cited

U.S. PATENT DOCUMENTS

| | | | |
|---|---|---|---|
| 2,523,906 | 9/1950 | Holmes | 128/142.2 |
| 2,764,097 | 9/1956 | Browne | 92/98 R |
| 2,950,739 | 8/1960 | Lofink | 92/98 D |
| 2,967,536 | 1/1961 | Stratman | 137/DIG. 9 |
| 3,011,833 | 12/1961 | Stelzer | 137/116.3 |
| 3,093,153 | 6/1963 | Horowitz | 137/102 |
| 3,096,778 | 7/1963 | Arborelius | 137/102 |
| 3,188,149 | 6/1965 | Pekrul | 137/102 |
| 3,228,731 | 1/1966 | Valentine | 137/102 |
| 3,250,288 | 5/1966 | Hammon | 137/116.3 |
| 3,357,447 | 12/1967 | Zarichansky | 137/DIG. 9 |
| 3,395,705 | 8/1968 | Hamilton | 128/276 |
| 3,433,222 | 3/1969 | Pinto | 128/204.26 |
| 3,467,137 | 9/1969 | Brown | 128/204.26 |
| 3,468,307 | 9/1969 | Cummins | 137/102 |
| 3,799,185 | 3/1974 | Milnes et al. | 137/102 |
| 4,041,977 | 8/1977 | Matsuno | 128/204.26 |

FOREIGN PATENT DOCUMENTS

| | | | |
|---|---|---|---|
| 1185065 | 1/1965 | Fed. Rep. of Germany | 137/DIG. 9 |
| 1260983 | 2/1968 | Fed. Rep. of Germany | 128/204.26 |
| 1233189 | 10/1960 | France | 128/204.26 |
| 1339898 | 12/1973 | United Kingdom | 128/204.26 |

*Primary Examiner*—Robert G. Nilson
*Attorney, Agent, or Firm*—Spensley, Horn, Jubas & Lubitz

[57] ABSTRACT

A diaphragm assembly for the demand regulator of a breathing apparatus utilizes a diaphragm that gradually flattens down against a conical platform so as to reduce the effective sensing area. Advantageously the diaphragm is used in conjunction with an aspirator opening adjusted for maximum aspiration effect at low flow rates. At increased flow rates the reduced sensing area compensates for increased aspiration, insuring stable operation. The diaphragm periphery cooperates with the conical platform outer edge to serve as the regulator exhaust valve.

10 Claims, 6 Drawing Figures

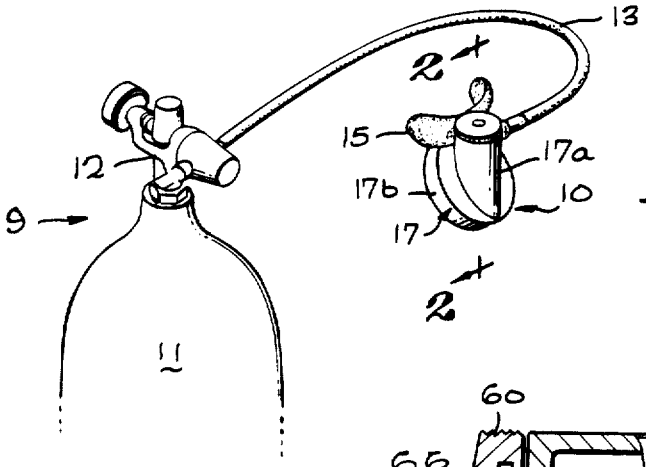
Fig. 4
Fig. 1
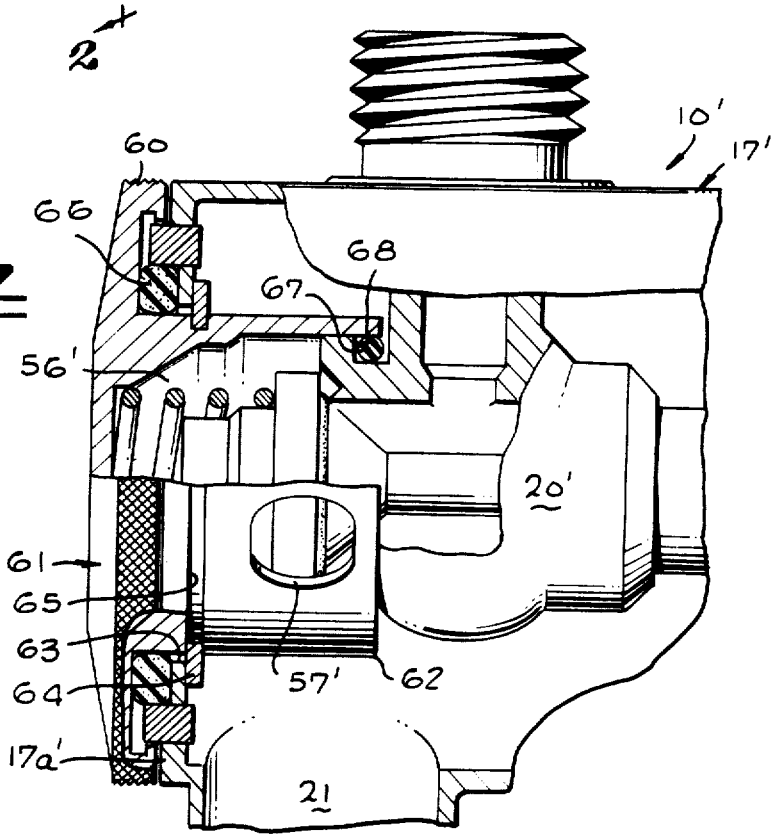
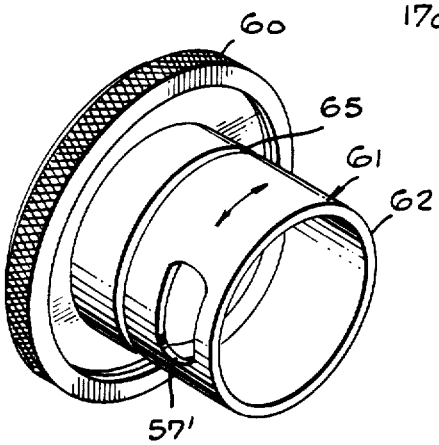
Fig. 3
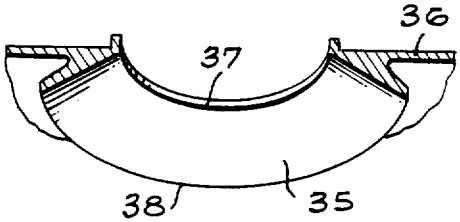
Fig. 6

DIAPHRAGM ASSEMBLY FOR THE DEMAND REGULATOR OF A BREATHING APPARATUS

Matter enclosed in heavy brackets [ ] appears in the original patent but forms no part of this reissue specification; matter printed in italics indicates the additions made by reissue.

*This reissue application is a continuation application of the parent reissue application Ser. No. 249,345 filed Mar. 31, 1981, now abandoned.*

BACKGROUND OF THE INVENTION

1. Field of the Invention

The present invention relates to a diaphragm assembly for the demand regulator of a breathing apparatus, and particularly to an assembly wherein the diaphragm has varying effective area and also serves as the exhaust valve.

2. Description of the Prior Art

In a typical self-contained underwater breathing apparatus, the regulator includes a first stage that reduces the breathable gas pressure to about 140 psi above ambient, and a second stage that supplies this breathable gas to the diver on demand. Inhalation pressure is sensed by a diaphragm within the second stage that cooperates to open a valve which controls the flow of gas to the diver.

A relatively large area diaphragm is required to sense the slight pressure drop at the beginning of inhalation. However, this large effective area becomes a disadvantage if an aspirator is used. As the flow rate of breathable gas to the diver increases, there is increasing aspiration effect. Thus the pressure drop sensed by the diaphragm increases disproportionately to actual demand. If the aspirator were set for maximum aspiration effect at low flow rates, the diaphragm would be sucked into the regulator case when the flow rate increased. As a result, prior art regulators required that the aspiration effect be minimized at low flow rates. This insured stable operation at higher mass flow rates, but had the disadvantage of reduced aspiration at times of low flow rate, such as at the beginning and end of the inhalation cycle.

An object of the present invention is to provide a demand regulator for a breathing apparatus having a diaphragm of variable effective area that facilitates the use of maximum aspiration at low mass flow rates.

Another shortcoming of prior art regulators is that a separate exhaust valve was provided to permit the escape of exhaled gases. A further object of the present invention is to provide a regulator in which the pressure sensing diaphragm also functions as the exhaust valve.

SUMMARY OF THE INVENTION

These and other objective are achieved by a demand regulator diaphragm assembly employing a diaphragm that gradually flattens down against a conical platform as the pressure in the regulator inner chamber decreases. The diaphragm thus exhibits a varying effective area.

When the diaphragm assembly is used with an aspirator, the aspiration effect can be maximized at low mass flow rates. As the flow rate increases, the sensed pressure drops. However, the diaphragm effective area is reduced, so that there is no tendency for the diaphragm to be displaced excessively. Stable operation results at all flow rates, and at all depths.

The periphery of the diaphragm seats on an annular ledge at the rim of the conical platform. During exhalation, the excess pressure within the regulator urges the diaphragm periphery away from the platform, opening a flow path for the exhaust gases. Thus the diaphragm assembly also functions as the exhaust valve for the regulator.

BRIEF DESCRIPTION OF THE DRAWINGS

A detailed description of the invention will be made with reference to the accompanying drawings wherein like numerals designate corresponding parts in the several figures. These drawings, unless described as diagrammatic, or unless otherwise indicated, are to scale.

FIG. 1 is a pictorial view of an underwater breathing apparatus having a regulator second stage incorporating the inventive diaphragm system.

FIG. 4 is a fragmentary sectional view of another regulator second stage having an adjustable aspirator.

FIG. 5 is a perspective view of the aspirator collar used in the regulator of FIG. 4.

FIG. 6 is a perspective view showing a portion of the diaphragm platform used in the embodiments of FIGS. 2 through 4.

DESCRIPTION OF THE PREFERRED EMBODIMENTS

Figure 2:
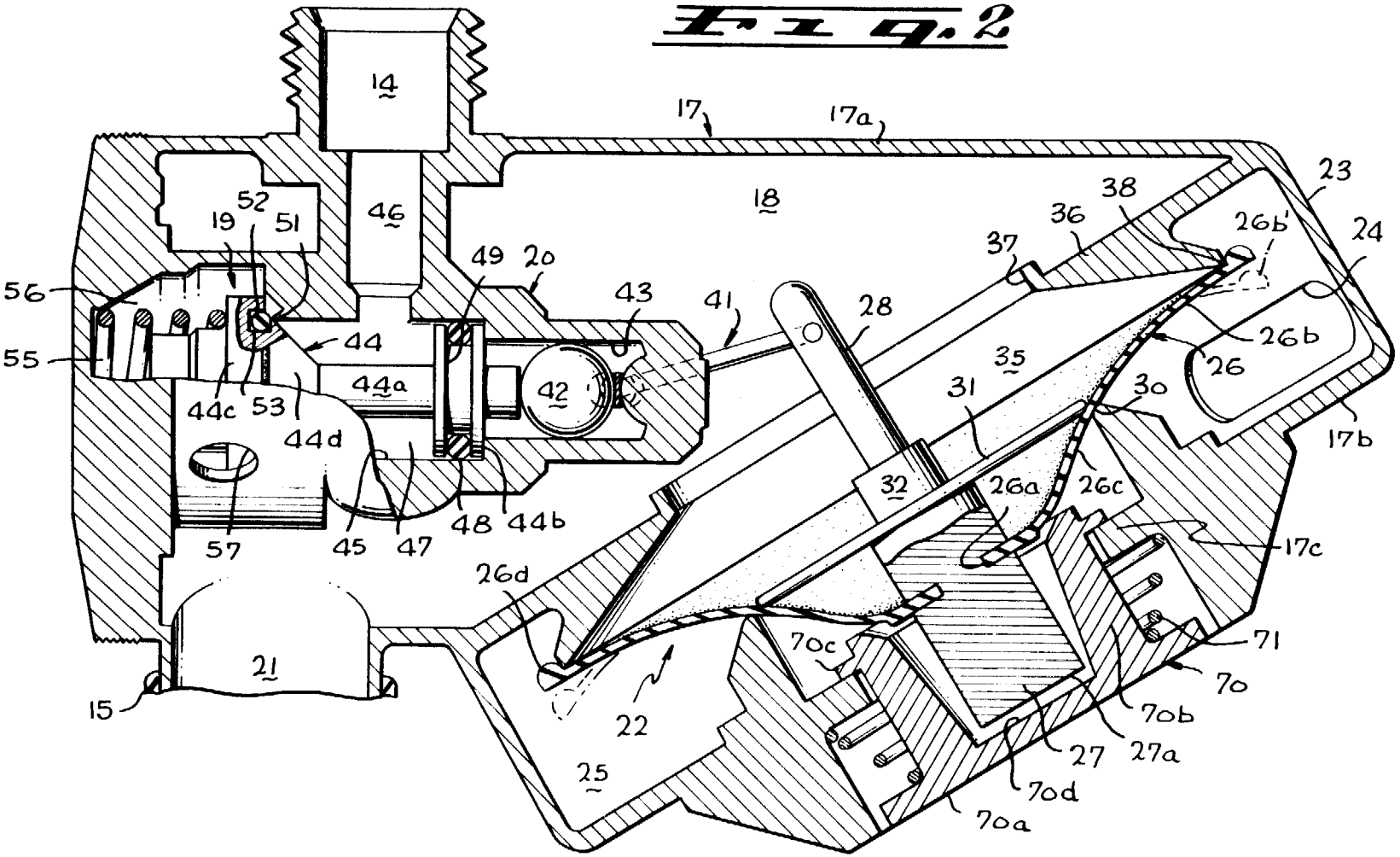
FIG. 2 is a sectional view of the regulator second stage as seen along the line 2—2 of FIG. 1, and showing the diaphragm in the rest position.

The following detailed description is of the best presently contemplated modes of carrying out the invention. This description is not to be taken in a limiting sense, but is made merely for the purpose of illustrating the general principles of the invention since the scope of the invention best is defined by the appended claims.

Operational characteristics attributed to forms of the invention first described also shall be attributed to forms later described, unless such characteristics obviously are inapplicable or unless specific exception is made.

In FIG. 1 there is shown a self-contained underwater breathing apparatus incorporating a demand regulator 10 in accordance with the present invention. The scuba system 9 includes a supply tank 11 containing breathable gas under high pressure. Attached to the tank 11 is a conventional regulator first stage 12 which provides the breathable gas at a reduced pressure, typically 140 psi above ambient, to a conduit 13. The regulator second stage 10 is connected to the other end of the conduit 13 via an inlet port 14, and functions to deliver breathable gas to a diver via a mouthpiece 15 upon inhalation demand.

As evident in FIGS. 1, 2 and 6, the body 17 of the regulator 10 includes a truncated cylindrical section 17a that defines an interior chamber 18. A flow control valve 19 is situated within a valve housing 20 which is supported coaxially within the body section 17a. The valve 19 controls the flow of breathable gas from the inlet port 14 to the mouthpiece 15 via an outlet port 21 that communicates with the interior chamber 18.

Rigidly attached to the truncated body section 17a is a generally cylindrical housing 17b that contains the inventive diaphragm assembly 22. This diaphragm housing 17b includes a cylindrical outer wall 23 having one or more openings 24 that admit water into the interior region 25 rearward of a diaphragm 26.

The diaphragm 26 is of generally circular, concave configuration and is made of a resilient rubber or plastic material. The diaphragm assembly 22 is not rigidly mounted, but rather "floats" within the housing 17b. The center 26a of the diaphragm 26 is affixed to a cylindrical retainer 27 that is rigidly connected to a shaft 28 which projects into the interior chamber 18 and is linked to the flow control valve 19.

An annular ridge or seat 30 is provided integral with the diaphragm housing 17b within the region 25. In the quiescent condition shown in FIG. 2, the diaphragm 26 rests on this annular seat 30. The diameter of the seat 30 typically is between about one-third and one-half of the diameter of the diaphragm 26.

During exhalation, the pressure in the chamber 18 exceeds that in the chamber 25. As a result, the exhaled gases cause the outer portion 26b of the diaphragm 26 to deflect rearward, as to the position 26b' shown in phantom in FIG. 2. The exhaled gases then flow through the region 25 and out of the regulator body 17 via the openings 24.

Only that portion of the diaphragm 26 having a radius larger than the seat 30 is deflected rearward during exhalation. Rearward movement of the central diaphragm section 26c, having a radius less than the seat 30, is prevented by a rigid disc 31 that is attached to the diaphragm retainer 27 and to the shaft 28 by means of a fitting 32. The diameter of the disc 31 is approximately the same as the annular seat 30, so that during exhalation the disc 31 rests atop the seat 30, separated therefrom by the thickness of the diaphragm 26, as shown in FIG. 2.

As evident in FIGS. 2 and 6, a rigid, conical platform 35 is formed in a wall 36 that separates the chamber 18 from the interior of the diaphragm housing 17b. The wall 36 has a central opening 37 that is approximately coaxial with the shaft 28 and has a diameter slightly greater than that of the disc 31. The conical platform 35 is truncated by the opening 37. The outer periphery of the platform 35 has a diameter slightly smaller than the diaphragm 26, and forms a ledge 38 against which the diaphragm rests in the quiescent state. A bead 26d at the outer periphery of the diaphragm 26 overhangs the ledge 38.

Figure 3:
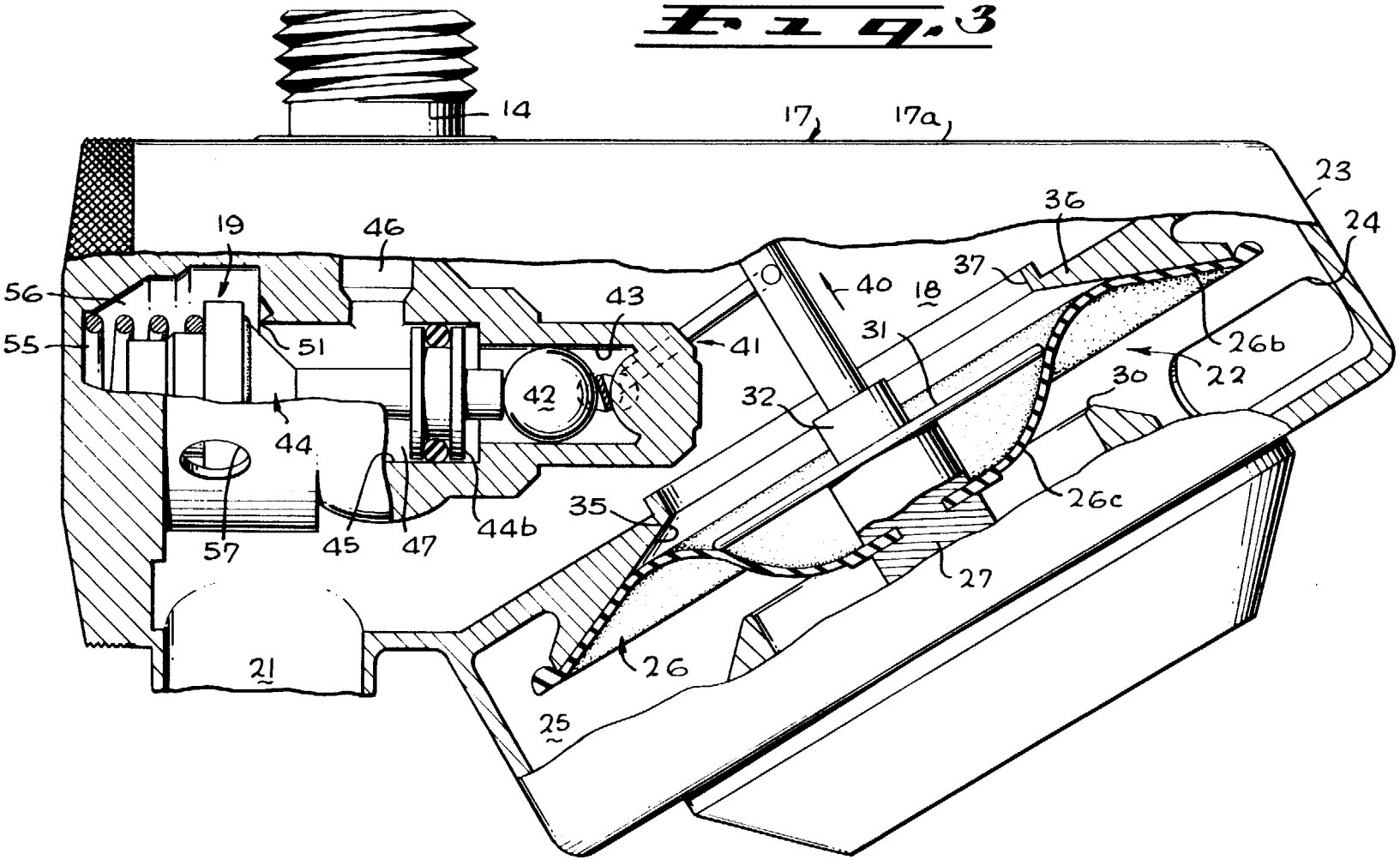
FIG. 3 is a transverse sectional view like FIG. 2, but with the diaphragm shown in a position for high mass flow of breathable gas through the regulator.

During inhalation the pressure in the chamber 18 is reduced, causing the diaphragm 26 and the shaft 28 to move in the direction of the arrow 40 (FIG. 3). A linkage 41 translates movement of the shaft 28 into axial displacement of a ball 42 that is constrained within a cylindrical bore 43 within the valve housing 20. Displacement of the ball 42 imparts movement to a valve poppet 44 in a direction that causes opening of the flow-control valve 19.

The poppet 44 is generally cylindrical and includes a reduced diameter section 44a situated within a cylindrical bore 45 that communicates with the inlet port 14 via a channel 46. With this arrangement, the annular space 47 between the poppet section 44a and the wall of the bore 45 contains breathable gas at the inlet pressure. Flow of this gas into the bore 43 is prevented by an O-ring seal 48 received in a groove 49 at the periphery of a flange 44b that is an integral part of the poppet 44.

The valve 19 itself includes an annular valve seat 51 having a generally V-shaped cross-section and situated at the open end of the bore 45. Cooperating with the seat 51 is an O-ring 52 mounted in an annular shoulder region 44c of the poppet 44. The O-ring 52 is held within an annular groove 53 by the overlapping edge of a conical section 44d of the poppet 44. The exposed portion of the O-ring 52 abuts against the annular valve seat 51 to close the flow valve 19 as shown in FIG. 2. The poppet 44 is biased to this closed position by means of a spring 55 contained within an annular space 56 within the valve housing 20.

During inhalation, displacement of the diaphragm 26 causes movement of the poppet 44 in a direction that carries the shoulder 44c and O-ring closure 52 away from the valve seat 51, as shown in FIG. 3. This permits breathable gas to flow from the inlet region 47 past the annular space between the valve seat 51 and the valve closure 52 into the space 56. From there, the breathable gas flows through an aspirator opening 57 formed in the wall of the valve housing 20 into the outlet port 21. In this manner, breathable gas is supplied to the diver on demand.

As breathable gas is supplied via the aspirator opening 57, an aspiration or venturi effect occurs which tends to reduce the pressure in the chamber 18. This in turn causes further motion of the diaphragm 26 and the shaft 28 in the direction of the arrow 40, so as to increase the opening of the valve 19 and hence to increase the flow of breathable gas to the diver via the aspirator opening 57. An aspirator "boost" is achieved.

In demand regulators having a conventional diaphragm, the aspirator opening must be positioned so that a low flow rates there is very little aspiration effect, and so that the maximum aspiration boost occurs at high flow rates. If the aspirator opening were set to provide maximum aspiration effect at low flow rates, then at a high flow rate the aspiration effect would be so great that the diaphragm would literally be sucked into the regulator interior chamber, and far too much breathable gas would be supplied to the diver. The regulator may become unstable or inoperative.

This severe shortcoming of the prior art is overcome in the present invention by reducing the effective diameter of the diaphragm 26 at high flow rates. The reduced effective diameter results as the diaphragm 26 begins to flatten against the conical platform 35 (FIG. 3) during the inhalation cycle.

As a result, the aspirator opening 57 can be positioned to provide maximum aspiration effect at low flow rates. As the flow rate increases, more and more of the diaphragm 26 flattens out against the conical platform 35, thereby decreasing the effective area of the diaphragm exposed to the pressure within the chamber 18. At higher flow rates there is increased aspiration effect, resulting in lower pressure in the chamber 18. However, since only a smaller area of the diaphragm 26 is exposed to this decreased pressure, there will be no excessive displacement of the diaphragm, as in the case of prior art regulators. In effect, the amount of aspiration effect is reduced at the higher flow rates, as a result of the lessor effective area of the diaphragm 26. Thus, the diaphragm assembly 22 enables the aspirator opening 57 to be set for maximum aspiration effect at very low flow rates, while insuring that as the flow rate increases the aspiration effect will not become excessive. Very stable operation results, and the increased aspiration effect reduces the breathing effort needed to actuate the regulator 10.

In the alternative embodiment of FIG. 4, the regulator 10' has an adjustable aspirator. This embodiment is particularly useful for deep-diving applications, where under heavy work conditions a diver may wish to increase the aspiration effect so as to reduce further the breathing effort. In the regulator 10', this aspirator adjustment can be made externally to the regulator body 17' by slightly rotating the knurled end cap 60 which is an integral part of an aspirator collar 61 illustrated in FIG. 5.

The aspirator collar 61 includes a cylindrical section 62 that contains the aspirator opening 57'. The section 62 is inserted through a circular opening 63 in the end 17a' of the regulator body 17'. The collar 61 is retained in place by a snap ring 64 that fits within a groove 65 in the cylindrical section 62. An O-ring 66 prevents leakage past the interface between the cap 60 and the housing end 17a'.

The cylindrical section 62 forms the outer wall of the space 56' into which breathable gas is admitted when the flow control valve 19 opens. This breathable gas then passes through the aspirator opening 57' to the outlet 21. A seal is achieved at the open end of the cylindrical section 62 by means of an O-ring 67 situated within a groove 68 formed in an outer section of the valve housing 20'.

The diaphragm assembly used with the regulator 10' is identical to that shown in the regulator 10 of FIGS. 2 and 3. By rotating the cap 60, the diver can change the location of the aspirator opening 57' and accordingly change the amount of aspiration provided by the regulator 10'.

Referring once again to FIG. 2, the regulator 10 is provided with a purge button 70 that is mounted on the diaphragm housing 17b. The purge button 70 includes a generally flat cap 70a formed integrally with a cylindrical section 70b which surrounds, but does not touch the diaphragm retainer 27. A peripheral flange 70c engages a shoulder 17c formed integrally with the housing 17b. A spring 71 is situated between this shoulder 17c and the cap 70a biases the purge button 70 to the rest position shown in FIG. 2.

When the purge button 70 is manually depressed against the force of the spring 71, the interior surface 70d of the cap 70a pushes against the end 27a of the diaphragm retainer 27. This in turn displaces the shaft 28 in the directin of the arrow 40 so as to cause the valve 19 to open. The resultant flow of breathable gas through the valve 19 purges the regulator 10.

Intending to claim all novel, useful and unobvious features shown or described, the applicant claims:

1. A diaphragm assembly for use with a demand regulator having a housing and a flow control valve situated in a valve housing within said regulator housing, said assembly comprising:

a diaphragm situated within said regulator housing to sense inhalation demand, said diaphragm being operatively linked to said flow control valve, a stationary symmetric conical platform mounted within said regulator housing, said platform having a central opening, said diaphragm being positioned so that its link extends through said central opening and so that upon displacement in response to reduced pressure in said regulator housing said diaphragm will gradually substantially geometrically uniformly seat against said stationary conical platform, thereby reducing the effective sensing area of the diaphragm in uniform proportion to the diaphragm displacement, said displacement in response to reduced pressure opening said flow control valve, and an aspirator in said valve housing, said aspirator being set to maximize the aspiration effect at low mass flow rates.

2. A diaphragm assembly according to claim 1 wherein said diaphragm is circular and slightly concave, and has a shaft that is connected to the diaphragm central region and is linked to said flow control valve so as to open said valve as said diaphragm is displaced toward said platform in response to reduced pressure in said housing.

3. A diaphragm assembly for use with a demand regulator having a housing and a flow control valve within said housing, said assembly comprising:

a diaphragm situated within said housing to sense inhalation demand, said diaphragm being operatively linked to said control valve, a stationary symmetric conical platform mounted within said housing, said platform having a central opening, said diaphragm being positioned so that its link extends through said central opening and so that upon displacement in response to reduced pressure in said housing said diaphragm will gradually, substantially geometrically uniformly seat against said stationary conical platform, thereby reducing the effective sensing area of the diaphragm in uniform proportion to the diaphragm displacement, said displacement in response to reduced pressure opening said flow control valve, and an aspirator, said aspirator being set to maximize the aspiration effect at low mass flow rates, said flow control valve being situated in a valve housing inside said regulator housing, said aspirator comprising a collar forming a portion of said valve housing and having an aspirator opening therethrough, said collar being integrally connected to a member external to said regulator housing to permit external adjustment of the position of the aspirator opening.

[4. A diaphragm assembly for use with a demand regulator having a housing and a flow control valve within said housing, said assembly comprising:

a diaphragm situated within said housing to sense inhalation demand, said diaphragm being operatively linked to said flow control valve, and a stationary symmetric conical platform mounted within said housing, said platform having a central opening, said diaphragm being positioned so that its link extends through said central opening and so that upon displacement in response to reduced pressure in said housing said diaphragm will gradually, substantially geometrically uniformly seat against said stationary conical platform, thereby reducing the effective sensing area of the diaphragm in uniform proportion to the diaphragm displacement, said displacement in response to reduced pressure opening said flow control valve, the portion of said regulator housing that contains said diaphragm having at least one opening to permit fluid flow into the region behind said diaphragm, the periphery of said diaphragm resting on the outer rim of said platform and being displaceable rearwardly away from said platform, to permit the exhaust of exhaled gases.]

5. A diaphragm assembly for use with a demand regulator having a housing and a flow control valve within said housing, said assembly comprising:

a diaphragm situated within said housing to sense inhalation demand, said diaphragm being operatively linked to said flow control valve, a platform mounted within said housing so that upon displacement in response to reduced pressure in said housing said diaphragm will gradually, substantially geometrically uniformly seat against said platform, thereby reducing the effective sensing area of the diaphragm in uniform proportion to the diaphragm displacement, the portion of said regulator housing which contains said diaphragm having at least one opening to permit fluid flow into the region behind said diaphragm, the periphery of said diaphragm resting on the outer rim of said platform and being displaceable rearwardly thereof to permit the exhaust of exhaled gases, and wherein said housing includes a generally cylindrical seat on the opposite side of said diaphragm from said platform, said seat having a diameter less than about half that of said diaphragm, and a rigid disc [attached to said shaft] *coupled to said diaphragm* on the same side of said diaphragm as said platform, the diameter of said disc being about the same as said seat, said [diaphragm and] disc resting against *said diaphragm and supported by* said seat when said regulator is in the quiescent state, *and*

*an aspirator in said housing, said aspirator being settable to maximize the aspiration effect at low mass flow rates.*

6. A diaphragm assembly according to claim 5 together with a purge button mounted to said regulator housing and positioned to displace said diaphragm [off of said seat] *and operate said flow control valve* when said purge button is depressed.

7. In a demand regulator for a breathing apparatus, the improvement comprising, a regulator body, a valve mounted within said body for controlling the flow of breathable air from a source to a user in response to inhalation demand, a diaphragm housing attached to said body, there being a partition between the interior of said body and the interior of said diaphragm housing, a conical platform formed in said partition, there being a concentric circular opening in said partition at the center of said platform, the periphery of said platform forming a ledge projecting from said partition, a diaphragm floatingly mounted in said diaphragm housing, the center of said diaphragm being attached to a shaft that extends through said opening and is operatively linked to said valve, the periphery of said diaphragm overlying the ledge of said conical platform, whereby reduced pressure within said body causes said diaphragm to move toward said opening, thereby causing said valve to open, said diaphragm gradually flattening against said conical platform so as to reduce the effective area of the diaphragm as the pressure decreases, the peripheral portion of said diaphragm bending away from said platform ledge due to excess pressure within said regulator body so as to provide an exhaust path for exhaled gases, *and*

*an aspirator cooperating with said diaphragm and being settable to maximize the aspiration effect at low mass flow rates.*

8. A demand regulator according to claim 7 wherein said [valve] *aspirator* has an aspirator opening through which breathable gas flows when the valve is open, said aspirator opening being positioned so that maximal aspiration effect is achieved at low flow rates, the decreased pressure in said regulator body resultant from aspiration at higher flow rates causing said diaphragm to flatten further against said platform so that the effective sensing area is reduced, whereby stable operation is achieved at all flow rates.

9. A demand regulator according to claim 8 wherein said aspirator opening is formed in an aspirator collar that is attached to said body and includes a cap situated externally to said body, rotation of said cap changing the radial position of said aspirator opening so as to facilitate external adjustment of the aspiration effect.

10. In a demand regulator having a housing, a mouthpiece and a flow control valve situated in a valve housing within said regulator housing, the improvement comprising:

a stationary truncated conical platform situated within said regulator housing and attached thereto, a diaphragm situated within said regulator housing on the opposite side of said conical platform from said flow control valve, said diaphragm moving toward said stationary conical platform in response to reduced pressure within said regulator housing resulting from inhalation through said mouthpiece, said diaphragm gradually, substantially geometrically uniformly seating against said conical platform during such motion in response to reduced pressure, so that the effective sensing area of the diaphragm is reduced, said diaphragm being operatively linked to said flow control valve to open said valve when said diaphragm is moved toward said platform, and wherein said valve housing has an aspirator opening through which breathable gas flows directly toward said mouthpiece when said flow control valve is open, said aspirator opening being positioned so that maximal aspiration effect is achieved at low flow rates, the decreased pressure in said regulator body resultant from aspiration at higher flow rates causing said diaphragm to flatten further against said platform so that the effective sensing area is further reduced, whereby stable operation is achieved at all flow rates.

*11. In a scuba regulator second stage of the type having a housing and a flow control valve situated within said housing to control the flow of breathable gas from a source to a mouthpiece, said second stage also having a diaphragm situated within said housing and linked to said flow control valve to operate the same in response to sensed inhalation demand, the improvement wherein:*

*said housing includes a member separating the interior of said housing into two regions, a first region containing said flow control valve and a second region containing said diaphragm, said separating member having a central opening through which extends a link connecting said diaphragm to said flow control valve,*

*said housing having at least one exhaust opening extending from said second region to the exterior of said housing,*

*a generally annular flared member attached to said separating member about said central opening and extending into said second region,*

*said diaphragm being flexible and being in peripheral rim contact with said annular flared member when*

*said diaphragm is in the quiescent state, said annular flared member having an annular edge at its outermost extremity and said diaphragm having a bead at its outmost extremity, said bead of the diaphragm overhanging said annular edge at its periphery, inhalation causing movement of said diaphragm toward said first region to cause concomitant opening of said flow control valve, said diaphragm being sufficiently flexible so that upon exhalation at least a portion of the periphery of said diaphragm is displaced away from said rim contact with said annular flared member so as to provide an exhaust path for exhaled gases from said first region to said second region through the separation between said displaced diaphragm periphery and said annular flared member, and thence through said exhaust opening to the exterior of said housing.*

* * * * *